No. 705,121. Patented July 22, 1902.
N. A. NEWTON.
VEHICLE WHEEL.
(Application filed Mar. 20, 1902.)

(No Model.)

Witnesses:
Otis B. Earl
Ethel A. Zeller

Inventor,
Nelson A. Newton
By Fred L. Chappell
Att'y.

THE NORRIS PETERS CO., PHOTO-LITHO., WASHINGTON, D. C.

UNITED STATES PATENT OFFICE.

NELSON A. NEWTON, OF KALAMAZOO, MICHIGAN.

VEHICLE-WHEEL.

SPECIFICATION forming part of Letters Patent No. 705,121, dated July 22, 1902.

Application filed March 20, 1902. Serial No. 99,114. (No model.)

*To all whom it may concern:*

Be it known that I, NELSON A. NEWTON, a citizen of the United States, residing at the city of Kalamazoo, in the county of Kalamazoo and State of Michigan, have invented certain new and useful Improvements in Vehicle-Wheels, of which the following is a specification.

This invention relates to improvements in vehicle-wheels, and particularly to wheels with steel or metal spokes, and is designed for use on carriages or wagons or in other relations where a strong light wheel is desired.

The objects of the invention are, first, to provide a wheel having metal spokes which will be strong and durable in proportion to its weight and easy to construct and to keep in repair; second, to provide a wheel which is economical to manufacture, inasmuch as the material entering into the same is of a simple and inexpensive kind and form and the wheel can be assembled or repaired by an inexperienced or unskilled workman; third, to provide an improved construction of vehicle-wheels having metal spokes wherein the tension on the spokes can be accurately and quickly adjusted and one in which any change in the tension due to contraction or expansion of the metal or wear may be quickly and easily adjusted; fourth, to provide an improved construction of vehicle-wheels in which the individual spokes can be readily removed or replaced without the employment of skilled labor and without disturbing the other parts of the wheel.

Further objects will definitely appear in the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1:
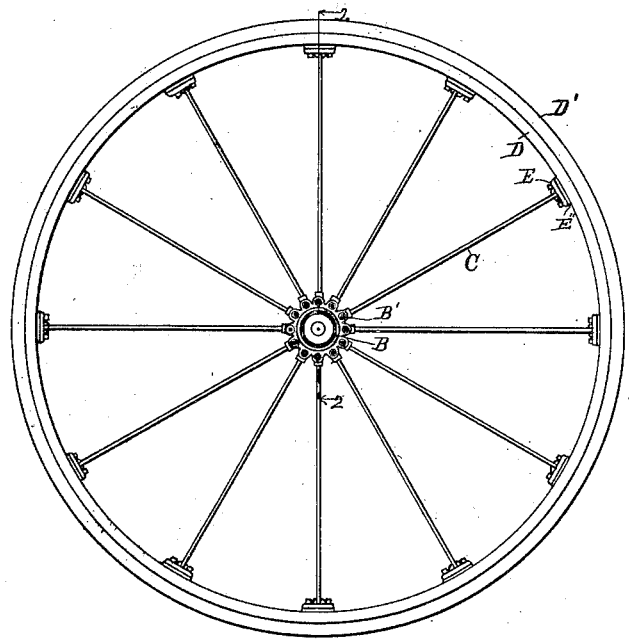
Figure 4:
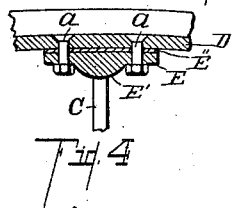
Figure 6:
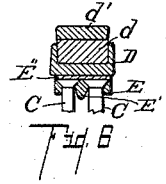
Figure 5:
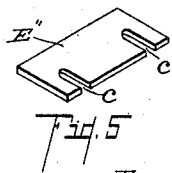
Figure 3:
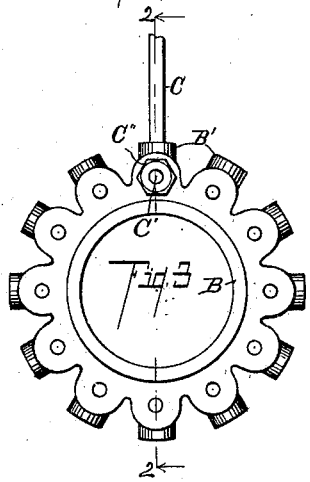
Figure 2:
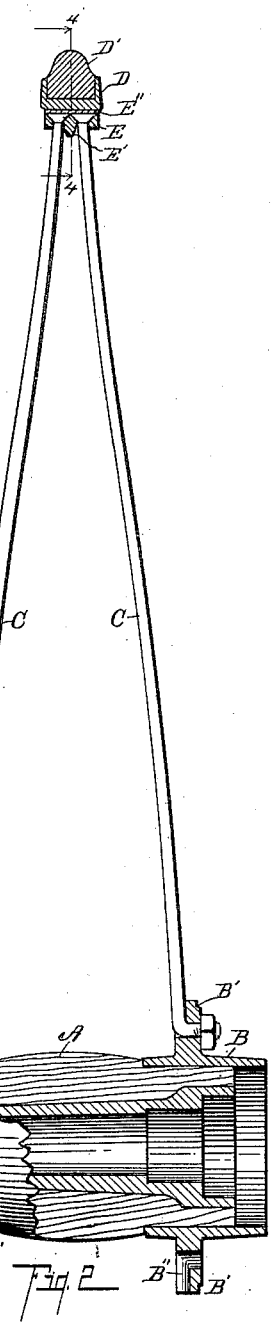

Figure 1 is a side elevation view of a structure embodying the features of my invention. Fig. 2 is a detail transverse sectional view of the same, taken on a line corresponding to line 2 2 of Fig. 1. Fig. 3 is a detail side elevation view of one of the flanged hub-bands B, to which the inner ends of the spokes are secured. Fig. 4 is a detail longitudinal sectional view taken on a line corresponding to line 4 4 of Fig. 2, the rubber tire or tread being removed. Fig. 5 is a perspective view of one of the tension-plates E''. Fig. 6 is a detail transverse sectional view of a modification wherein the structure is adapted to a wood felly and a metal tire.

In the drawings all of the sectional views are taken looking in the direction of the little arrows at the ends of the section-lines, and similar letters of reference refer to similar parts throughout the several views.

Referring to the lettered parts of the drawings, A represents the wood portion of the hub, which is bored to receive a suitable boxing. On each end of the hub are bands B, having outwardly-projecting flanges or lugs B'. These projections are suitably perforated to receive the ends of the spokes C, which are bent substantially at right angles at C' to extend through the perforations in the flanges. The ends C' of the spokes are screw-threaded to receive the nuts C'', by which means they are securely retained in the hub. The flanges are preferably formed with seats B'' in line with said perforations to receive the ends of the spokes. This assists in maintaining them in proper position and also adds to the strength of the structure. Before the spokes are secured to the bands B of the hub they are passed through suitable perforations in the tire-plates E, which plates are countersunk to receive suitable heads formed on the ends of the spokes. Channel tires or rims D are then placed upon the wheel. It is desirable that the spokes should be under a slight tension. In order to secure the proper adjustment in a simple and effective manner, I prefer to make the rim a little large and provide thin tension-plates E'', adapted to be inserted between the tire-plate and the rim. These tension-plates are notched at c c to engage the bolts a a, by means of which the tire-plates are secured to the tire. It is not necessary that these tension-plates should be placed in under every tire-plate in order to maintain the proper tension on its spokes, and it is intended that only a sufficient number shall be used to produce the proper adjustment. Two or more plates may be used at one point, if necessary. It is apparent that the removal of one plate at any point serves to increase the tension on the entire wheel, so that should it be desired to increase the tension on the wheel at any time a tension-plate may be removed and the tire-plate drawn up, and it will be found that the tension on all of the spokes is thereby increased. The tension-plates are not an essential, as the proper proportion of the tire and spokes may be procured by careful construction. They are very desirable, however, as they avoid the necessity of such care in manufacture and enable a quick and perfect adjustment at any time. The bolts $a\ a$ are preferably passed through from the outside of the tire and secured by suitable nuts on the inside, so that should occasion require one of the tire-plates E can be removed or can be loosened and the tension-plates removed or inserted without disturbing the remainder of the wheel. I prefer to form the tire plates or clips E with a thickened portion E' through the center as a strengthening means.

The channeled tire is adapted to receive a suitable cushion or rubber tire D'.

In the modified structure shown in Fig. 6 $d$ represents a felly of wood or other material placed in the channeled tire D, about which is a metal tire $d'$ of the usual form. This forms a very satisfactory structure where a metal tire is desired.

When it is desired to remove a spoke from the wheel for any purpose, the tire-plate may be removed from the channeled tire or rim and the nut C'' removed, when the spoke can be taken out and another inserted without disturbing the remainder of the wheel in any manner. This operation can be accomplished in a very short time. As the spokes are under tension, there is no possibility of their loosening or rattling. Should this occur, however, it can be quickly remedied by means of the tension-plates, as before stated. The structure also forms a very practical spring-wheel.

I have illustrated and described my improved wheel in the form I believe to be the most practical, although I am aware that it is capable of considerable variation in its structural details without departing from my invention. I have shown the most practical form of attaching spokes and also of adjusting the tension on the same, which I desire to claim specifically as well as broadly.

Having thus described my invention, what I claim as new, and desire to secure by Letters Patent, is—

1. In a vehicle-wheel, the combination of the wood center portion A; bands having suitable perforated flanges or projections B', with suitable seats B'' therein; spokes C having their lower ends formed to extend through the perforations in the said hub-bands and screw-threaded to receive suitable nuts C''; plates E suitably perforated to receive the spokes C therethrough; a channeled rim D, to which said plates are secured; tension-plates E'', adapted to be inserted between said plates E and said channeled rim; and a suitable tire D' in said channeled rim, all coacting for the purpose specified.

2. In a vehicle-wheel, the combination of the wood center portion A; bands having suitable perforated flanges or projections B with suitable seats B'' therein; spokes C having their lower ends formed to extend through perforations in the said hub-bands and screw-threaded to receive suitable nuts C''; plates E suitably perforated to receive the spokes C therethrough; a channeled rim D to which said plates are secured in a manner to put tension on said spokes; and a suitable tire D' in said channeled rim, all coacting for the purpose specified.

3. In a vehicle-wheel, the combination of a hub; hub-bands with outwardly-projecting flanges or lugs; suitable seats therein to receive the spokes; spokes adapted to rest in said seats and engaging said flanges and threaded to receive suitable retaining-nuts; tire-plates with countersunk perforations to receive heads on the outer ends of said spokes; a rim to which said plates are detachably secured; tension-plates adapted to be inserted between said tire-plates and rim, to regulate the tension on the spokes, as specified.

4. In a vehicle-wheel, the combination of a hub; hub-bands with outwardly-projecting flanges or lugs; suitable seats therein to receive the spokes; spokes adapted to rest in said seats and engaging said flanges and threaded to receive suitable retaining-nuts; tire-plates with countersunk perforations to receive heads on the outer ends of said spokes; a rim to which said tire-plates are detachably secured in a manner to put tension on said spokes, for the purpose specified.

5. In a vehicle-wheel, the combination of a hub; hub-bands with outwardly-projecting flanges having perforations to receive the spokes formed therein; metal spokes with heads at their outer ends; tire-plates with countersunk perforations to receive the heads on the outer ends of said spokes; a rim to which said tire-plates are detachably secured; tension-plates adapted to be inserted between said tire-plates and said rim, to regulate the tension on said spokes, for the purpose specified.

6. In a vehicle-wheel, the combination of a suitable hub; metal spokes with heads at their outer ends secured thereto; tire-plates with countersunk perforations to receive the heads on the outer ends of the said spokes; a rim to which said tire-plates are secured; and tension-plates adapted to be inserted between said rim and said tire-plates, for the purpose specified.

In witness whereof I have hereunto set my hand and seal in the presence of two witnesses.

NELSON A. NEWTON. [L. S.]

Witnesses:
ETHEL A. TELLER,
OTIS A. EARL.